2,847,392
Patented Aug. 12, 1958

2,847,392
METHOD OF CONDITIONING SOIL WITH A NON-ELECTROLYTE ELASTOMERIC CONJUGATED DIENE POLYMER

John C. Eck, Convent, N. J., assignor to Allied Chemical Corporation, New York, N. Y., a corporation of New York No Drawing. Application June 15, 1953
Serial No. 361,827

9 Claims. (Cl. 260—41.5)

This invention relates to methods of conditioning soils which improve the physical structure and tilth of the soil. It is particularly directed to methods of aggregating soils of poor structure to form desirable particulate distribution therein, thus facilitating plant growth and minimizing erosion.

It has been found that soils of poor structure are characterized by inadequate particulate aggregation. Such soils are of poor tilth, low capillarity, low absorption and have low resistance to erosive forces such as raindrop impact or flow of water thereon. Plant root growth in such soils is hintered by their compactness and density and because their low porosity prevents proper passage, retention and availability of air and moisture. In addition, because of these characteristics, nutrients in such soils are not fully available for plant absorption. Soils of desirable structure, upon drying, do not shrink and form fissures as do those of poor structure, especially clays, but retain a natural crumbly texture which is easily worked, is resistant to erosion, is easily penetrated by plant structures, and retains moisture.

Defective properties of soils, especially of clay and heavy loam, may be improved but only temporarily or inadequately by physical means, such as tilling, or by addition to the soil of various organic humus-like materials.

It has been postulated that the differences in structure between the undesirable and desirable types of soils are attributable to differences in the character of electrical charges of the individual soil particles and their contents. Accordingly, it has been proposed to condition or improve the poor type soils, for example, structurally undesirable clayey and loam soils by application to them of certain water-soluble synthetic polyelectrolytes. Such a suggestion appears in U. S. Patent 2,625,529.

It has now been discovered that soils having poor structure and tilth, as well as poor porosity, moisture retention, and erosion resistant properties are improved by application thereto of the latices of certain water-insoluble nonelectrolytic polymers to produce, contrary to expectation, desired aggregation of the soil particles and a conditioned or improved hydrophilic soil having desirable properties in all respects. In fact, the improvement obtained is often substantially greater than and even many times that obtained by use of the substances proposed heretofore.

Accordingly, it is an object of the invention to improve the properties of soil having a bearing on its value as plant growth medium. Another object is to increase erosion resistance of soils. A further object is to effect the above objects simply and economically. Still other objects will be apparent from the detailed discussion which follows.

The invention comprises applying to soil to be conditioned, the latices of substantially water-insoluble, non-electrolytic polymers which upon coagulation produce elastomers, that is, elastic, sticky, cohesive, rubber-like masses. Latices which on coagulation do not form such elastomers, but form non-rubber-like materials instead, do not produce the soil conditioning effects characteristic of the practice of the invention. Preferred among the latices which have the desired soil conditioning effect are those which contain polymerized diene hydrocarbons or their substituted derivatives (for example butadiene, its homologs, and substituted derivatives thereof), including homopolymers of such dienes or their derivatives, and water-insoluble, nonelectrolytic, elastomer-forming copolymers thereof with other substances including unsaturated olefinic substances. For ease of reference, the polymer content of the latices containing the types of polymer which may be used in practice of this invention will be hereinafter referred to as elastomer-forming polymers. The preferred types of such polymers are those forming butalastics.

In production of the latices of elastomer-forming polymers employed in practice of the invention, catalytic polymerization in aqueous emulsion of the appropriate monomer or monomers is employed. It is preferred to apply the polymers to the soil in emulsion form, in which event the emulsion recovered from the polymerization process may be applied as such and with or without dilution by addition of water. It is necessary that the polymer remain in uncoagulated form during its application to the soil. Therefore, it may be preferred to increase stabilization or fixing of the polymer within the latex before its use by having present therein a substance which decreases any tendency of the elastomer-forming polymer to coagulate. When such agent is not present in the latex as originally formed, for example by its inclusion in the reaction menstruum in which the polymer is formed, it may be added to the emulsion product. A satisfactory stabilizing substance for many, if not most, such polymers, including butalastic-forming polymers as well as others, is one which in solution is alkaline and produces the ammonium cation, for example ammonium hydroxide. Other stabilizing agents suitable for latices of elastomer-forming polymers include amines, ethanolamines, and ammonia-containing solutions of ammonium nitrate.

It is one of the features of the invention that the latices of elastomer-forming polymers may be either acid or alkaline as applied to prevent aggravation by the soil conditioning process of overacidity or excess alkalinity of the soil as the case may be. In its application it may be contacted with the soil to be treated as an aqueous stream or spray, preferably in such quantity as to permit its penetration within the area undergoing treatment to a depth of one-half inch or more. As so applied, the aqueous menstruum may preferably contain 0.1% to 40% by weight of desired elastomer-forming polymer determined by drying to constant weight. The amount and concentration of liquid applied will tend to vary with differences in the moisture content of the soil at the time of application. The quantity of elastomer-forming polymer within the liquid is preferably such as to result in its deposition on the soil surface at a rate of 12 to 100 pounds per acre of surface treated and for each inch of desired penetration. To effect deep penetration of the soil, it is sometimes desirable to spray the latices on the surface in desired quantity and follow the spray operation by a suitable working or tillage to accelerate mixing of the same with the soil to desired depth.

Preferred polymers suitable for practice of the invention include those which, produced by emulsion polymerization, form butalastics upon being coagulated. As representative of such polymers are homopolymers and copolymers of monomeric butadiene hydrocarbons and their derivatives, for example, butadiene-1,3 as such or containing as substituent one or more hydrocarbons, halogens or other non-electrolytic groups. Specific members of this class of monomers include isoprene, chloroprene, dimethylbutadiene, cyclopentadiene, and cyanobutadiene.

Typical butalastic-forming copolymers formed from monomers of this class include copolymers of any two of the following monomers: butadiene, chloroprene, isoprene, dimethylbutadiene, cyanobutadiene, and cyclopentadiene.

The desired water-insoluble, non-electrolytic, butalastic-forming polymers include copolymers of any of the above mentioned diene hydrocarbons with one or more other unsaturated organic substances. Typical of such other organic substances are acrylic and substituted acrylic acids, their alkyl and alkenyl esters and nitriles; vinyl halides; vinyl esters; alkenyl aromatics; unsaturated alcohols; and olefines with additional unsaturation such as isopropenyl acetylene. Specific copolymeric butalastic-forming substances which in latex form have demonstrated outstanding soil conditioning properties include butadiene-isoprene, butadiene-methallyl alcohol, butadiene-vinyl chloride, butadiene-acrylonitrile, butadiene-methyl acrylate, butadiene-methacrylonitrile, butadiene-methyl methacrylate, chloroprene-butadiene, chloroprene-methyl acrylate, chloroprene-styrene, chloroprene-vinyl chloride, butadiene-styrene, and butadiene-isopropenyl acetylene.

As typical of elastomer-forming polymers where the elastomer is other than a butalastic, there may be mentioned natural rubber latices, homopolymers of 2-ethylhexyl acrylate, and copolymers of 2-ethylhexyl acrylate with vinyl chloride.

The copolymers of diene hydrocarbon compounds and other substances used in practice of the invention are preferably those in which the diene hydrocarbon or derivative is present in quantity which at least equals on a molar basis the quantity of other substance. Ordinarily the diene compound should be present, for achievement of the best results, in mol ratio of at least 1:1, and preferably 2:1 and higher with respect to other monomer present.

The elastomer-forming latices used in practice of the invention ordinarily have little or no plant nutrient value. They may, however, be applied in admixture with suitable plant nutrient substances which do not effect coagulation to substantial extent of the polymeric substances. Such nutrient may be dispersed, suspended, or dissolved in the emulsion or latex. Typical nutrients include nitrogen, potassium and phosphorus.

In effecting polymerization by emulsion polymerization process, polymerizable unsaturated starting material suitable for producing elastomer-forming polymers for practice of the invention is introduced in known manner into a suitable amount of water or other dispersing or reaction medium, containing an emulsifying agent and, if desired, a chain terminator. The specific nature and quantity of emulsifying agent used will depend, as is known, upon the nature of the monomer or monomers present and upon other characteristics of the reaction medium and conditions of polymerization. Suitable emulsifying agents for each homopolymer and copolymer reaction system which produces latices containing elastomer-forming polymer suitable for use in practice of the invention will be known to or readily ascertainable by persons skilled in the art. Likewise, suitable catalysts and other ingredients of the polymerization reaction system, for example substances to limit the size of the high molecular weight linear polymer molecule attained (sometimes termed chain terminators or stoppers), will also be known or readily ascertainable, as will appropriate polymerization conditions including temperatures, pressures, reaction times, and the like.

The reasons why the latices of elastomer-forming polymers operate effectively as soil conditioners, cannot be explained simply on the basis of presently projected theories of soil conditioning. It appears that the most effective latices are those of long open chain polymers such as those that may be obtained under suitable polymerization conditions by homopolymerization or copolymerization. To obtain preferred open chains which are those containing a minimum of branch chains, small amounts of catalyst are usually satisfactory. However, larger quantities of catalyst do not ordinarily have substantial adverse effects upon the type of polymer chain formed. In typical polymerization system yielding emulsions of high soil conditioning activity involving use of conjugated butadiene as monomer and potassium persulfate as catalyst, about 0.3% of the latter by weight of the former has been found to be quite satisfactory. It will be understood that quantities of other catalysts having different specific activities which produce a polymer of equivalent structure and molecular weight are contemplated in preparation of the soil conditioning emulsions with which the invention is concerned.

In order further to control the configuration and size of the non-electrolytic, water insoluble polymers it is usually preferred to employ in the emulsion polymerizing system a suitable chain terminator substance. The quantity of such substance should be carefully selected to avoid formation of unduly short or branched chains. In the polymerization with a system containing conjugated butadiene monomer using potassium persulfate catalyst, excellent chain length and activity of the emulsion are obtained with dodecyl mercaptan in amount of up to about 0.1% or somewhat more by weight of that monomer. The activity of the emulsion tends to decrease with increasing quantities of this terminator, and amounts of about 5% or over on the above noted basis should be avoided. As with the case of catalyst, different chain terminators have differing specific effects and use of suitable quantities of other terminators having effects equivalent to that of about 0.1% and somewhat more of dodecyl mercaptan is contemplated in preparation of the active emulsions of this invention.

The specific examples presented hereinafter are illustrative of but not limiting on the latices containing polymeric elastomer-forming substances suitable for use as soil conditioners in practice of this invention. For purposes of indicating the relative effectiveness of each of the resulting latices for such purpose, they were diluted with water to concentration of 0.06 percent by weight of polymer, and 0.04 percent by weight of ammonium hydroxide was added thereto. This mixture was thereafter added to dry Whippany Loam soil, all of which passed through a 60-mesh sieve (250 micron openings). This soil is one of a clayey nature which is highly dispersed, is highly susceptible to erosion, has poor water retention properties, and dries after wetting to hard, cracked, compact, dense cake form. The wetted soil was mixed by hand and in its resulting plastic clayey form was pressed through a 4-mesh sieve into a shallow tray. Wet paper towels were then place over the extruded soil and kept there to preserve it in wet condition for a period of 24 hours. The soil was then air dried for the succeeding 24 hours and at the end of that period it was placed in the top sieve of a nest of sieves providing successively below one another 20, 40 and 60 mesh screens. The nest of screens containing soil was immersed in water and raised and lowered therein through a distance of 1½ inches at the rate of 28.5 cycles per minute for a 30 minute period. At the end of such immersion the water was drained from the soil and that on each sieve was dried to constant weight at about room temperature. The total amount of material remaining on the 20-mesh screen and on all three screens was determined and noted as the amount of soil particles greater than 20 or 60 mesh size, respectively.

The testing procedure described above was repeated with the same soil after its conditioning by similar treatment with 0.1% by weight of a polyelectrolyte which was a hydrolyzed maleic anhydride-vinyl acetate copolymer containing about 4% calcium. The weight percentages of particles of soils treated with this polyelectrolyte retained on the 20 mesh screen or on all the screens were assigned, for comparative purposes, a rating of 100. Using this rating as a basis, the quantities of the soil samples retained by the screens after treatment by the latices of the examples, were translated to comparable values or ratings. These ratings are shown in the table following the examples as indicative of the soil conditioning values of the respective elastomer-forming polymers contained in those respective latices.

EXAMPLE 1

|  | Parts by weight |
|---|---|
| Butadiene | 40 |
| Water | 72 |
| "Lux"[1] (emulsifier) | 2 |
| Dodecyl mercaptan (chain terminator) | 0.04 |
| Potassium persulfate (catalyst) | 0.12 |

[1] Sodium stearate.

The above ingredients were placed in a glass reaction vessel and the mixture agitated at 50° C. for 24 hours. At the end of this time, the vessel was cooled to room temperature (20°–25° C.) and unreacted butadiene was vented. The latex produced was found to have a pH of 9.33, and to contain 31.3% by weight of polymer. Conversion to polymer was 72%.

EXAMPLE 2

|  | Parts by weight |
|---|---|
| Butadiene | 33.3 |
| Water | 60 |
| Dodecyl amine (emulsifier) | 1.7 |
| Hydrochloric acid (18 N) (emulsifier) | 1.1 |
| Dodecyl mercaptan (chain terminator) | 0.033 |
| Potassium persulfate (catalyst) | 0.066 |

The above ingredients were placed in a glass reaction vessel and the mixture was agitated at 50° C. for 18 hours. At the end of this time, the vessel was cooled to room temperature (20° C.–25° C.) and unreacted butadiene was vented. The latex produced had a pH of 1.64 and contained 34.4% by weight of polymer.

EXAMPLE 3

|  | Parts by weight |
|---|---|
| Butadiene | 33.3 |
| Water | 60 |
| Sodium nonyl sulfate (emulsifier) | 1.7 |
| Dodecyl mercaptan (chain terminator) | 0.033 |
| Potassium persulfate (catalyst) | 0.066 |

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 2.49 and contained 1.6% by weight of polymer.

EXAMPLE 4

|  | Parts by weight |
|---|---|
| Butadiene | 33.3 |
| Water | 60 |
| "Igepon T"[1] (emulsifier) | 1.7 |
| Dodecyl mercaptan (chain terminator) | 0.033 |
| Potassium persulfate (catalyst) | 0.066 |

[1] N-methyl, N-(sodium taurinate) (oleamide).

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 6.12 and contained 12.5% by weight of polymer.

EXAMPLE 5

|  | Parts by weight |
|---|---|
| Butadiene | 33.3 |
| Water | 60 |
| "Nacconol NRSF"[1] (emulsifier) | 1.7 |
| Dodecyl mercaptan (chain terminator) | 0.033 |
| Potassium persulfate (catalyst) | 0.066 |

[1] Kerylbenzene sulfonic acid (sodium salt).

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 2.72 and contained 9.0% by weight of polymer.

EXAMPLE 6

|  | Parts by weight |
|---|---|
| Butadiene | 33.3 |
| Water | 60 |
| "Duponol ME"[1] (emulsifier) | 1.7 |
| Dodecyl mercaptan (chain terminator) | 0.033 |
| Potassium persulfate (catalyst) | 0.066 |

[1] Sodium lauryl sulfate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 6.49 and contained 26.8% by weight of polymer.

EXAMPLE 7

|  | Parts by weight |
|---|---|
| Butadiene | 33.3 |
| Water | 60 |
| "Aerosol MA"[1] (emulsifier) | 1.7 |
| Dodecyl mercaptan (chain terminator) | 0.066 |
| Potassium persulfate (catalyst) | 0.066 |

[1] Dihexyl sodium sulfosuccinate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 2.63 and contained 5.4% by weight of polymer.

EXAMPLE 8

|  | Parts by weight |
|---|---|
| Butadiene | 33.3 |
| Water | 60 |
| "Aerosol OT"[1] (emulsifier) | 1.7 |
| Dodecyl mercaptan (chain terminator) | 0.066 |
| Potassium persulfate (catalyst) | 0.066 |

[1] Dioctyl sodium sulfosuccinate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 3.80 and contained 8.8% by weight of polymer.

EXAMPLE 9

|  | Parts by weight |
|---|---|
| Butadiene | 33.3 |
| Water | 60 |
| Decylbenzyl sodium sulfate (emulsifier) | 1.7 |
| Dodecyl mercaptan (chain terminator) | 0.066 |
| Potassium persulfate (catalyst) | 0.066 |

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 6.78 and contained 20.8% by weight of polymer.

EXAMPLE 10

| | Parts by weight |
|---|---|
| Dimethylbutadiene | 10 |
| Water | 36 |
| "Lux"[1] (emulsifier) | 1.0 |
| Dodecyl mercaptan (chain terminator) | 0.02 |
| Potassium persulfate (catalyst) | 0.06 |

[1] Sodium stearate.

The above ingredients were placed in a glass reaction vessel and the mixture was agitated at 50° C. for 24 hours. At the end of this time, the vessel was cooled to room temperature (20° C.–25° C.) and unreacted material was vented. The latex produced had a pH of 9.7 and contained 18.2% by weight of polymer.

EXAMPLE 11

| | Parts by weight |
|---|---|
| Isoprene | 40 |
| Water | 200 |
| "Lux"[1] (emulsifier) | 2.0 |
| Dodecyl mercaptan (chain terminator) | 0.2 |
| Potassium persulfate (catalyst) | 0.12 |

[1] Sodium stearate.

The above ingredients were placed in a glass reaction vessel and the mixture was agitated at 50° C. for 20 hours. At the end of this time, the vessel was cooled to room temperature (20° C.–25° C.) and unreacted material was vented. The latex produced had a pH of 8.67.

EXAMPLE 12

| | Parts by weight |
|---|---|
| Chloroprene | 10 |
| Water | 18 |
| "Lux"[1] (emulsifier) | 0.5 |
| Dodecyl mercaptan (chain terminator) | 0.01 |
| Potassium persulfate (catalyst) | 0.03 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 5.63 and contained 30.0% by weight of polymer.

EXAMPLE 13

| | Parts by weight |
|---|---|
| Butadiene | 26.7 |
| Isoprene | 6.6 |
| Water | 60 |
| "Lux"[1] (emulsifier) | 1.7 |
| Dodecyl mercaptan (chain terminator) | 0.033 |
| Potassium persulfate (catalyst) | 0.066 |

[1] Sodium stearate.

The above ingredients were placed in a glass reaction vessel and the mixture was agitated at 50° C. for 22 hours. At the end of this time, the vessel was cooled to room temperature (20° C.–25° C.) and unreacted material was vented. The latex produced had a pH of 9.74 and contained 21.6% by weight of polymer.

EXAMPLE 14

| | Parts by weight |
|---|---|
| Butadiene | 25 |
| Isopropenylacetylene | 8.3 |
| Water | 60 |
| "Lux"[1] (emulsifier) | 1.7 |
| Dodecyl mercaptan (chain terminator) | 0.033 |
| Potassium persulfate (catalyst) | 0.066 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 9.98 and contained 11.2% by weight of polymer.

EXAMPLE 15

| | Parts by weight |
|---|---|
| Chloroprene | 5 |
| Butadiene | 5 |
| Water | 18 |
| "Lux"[1] (emulsifier) | 0.5 |
| Dodecyl mercaptan (chain terminator) | 0.01 |
| Potassium persulfate (catalyst) | 0.03 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 6.49 and contained 28.6% by weight of polymer.

EXAMPLE 16

| | Parts by weight |
|---|---|
| Butadiene | 48 |
| Methyl acrylate | 32 |
| Water | 144 |
| "Lux"[1] (emulsifier) | 4.0 |
| Dodecyl mercaptan (chain terminator) | 0.4 |
| Potassium persulfate (catalyst) | 0.24 |

[1] Sodium stearate.

The above ingredients were placed in a glass reaction vessel and the mixture was agitated at 50° C. for 15 hours. At the end of this time, the vessel was cooled to room temperature (20° C.–25° C.) and unreacted material was vented. The latex produced had a pH of 7.05 and contained 37.5% by weight of polymer.

EXAMPLE 17

| | Parts by weight |
|---|---|
| Butadiene | 20 |
| Methyl methacrylate | 20 |
| Water | 144 |
| "Lux"[1] (emulsifier) | 4.0 |
| Dodecyl mercaptan (chain terminator) | 0.4 |
| Potassium persulfate (catalyst) | 0.24 |

[1] Sodium stearate.

The above ingredients were placed in a glass reaction vessel and the mixture was agitated at 50° C. for 14 hours. At the end of this time, the vessel was cooled to room temperature (20° C.–25° C.) and unreacted material was vented. The latex produced had a pH of 7.61 and contained 23.7% by weight of polymer.

EXAMPLE 18

| | Parts by weight |
|---|---|
| Chloroprene | 12 |
| Methyl acrylate | 8 |
| Water | 36 |
| "Lux"[1] (emulsifier) | 1.0 |
| Dodecyl mercaptan (chain terminator) | 0.1 |
| Potassium persulfate (catalyst) | 0.06 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 7.08 and contained 27.3% by weight of polymer.

EXAMPLE 19

| | Parts by weight |
|---|---|
| Butadiene | 16 |
| Styrene | 4 |
| Water | 72 |
| "Lux"[1] (emulsifier) | 2.0 |
| Dodecyl mercaptan (chain terminator) | 0.2 |
| Potassium persulfate (catalyst) | 0.12 |

[1] Sodium stearate.

The above ingredients were placed in a glass reaction vessel and the mixture was agitated at 50° C. for 20 hours. At the end of this time, the vessel was cooled to room temperature (20° C.–25° C.) and unreacted material was vented. The latex produced had a pH of 7.68 and contained 22.5% by weight of polymer.

EXAMPLE 20

| | Parts by weight |
|---|---|
| Chloroprene | 8 |
| Styrene | 2 |
| Water | 36 |
| "Lux"[1] (emulsifier) | 1.0 |
| Dodecyl mercaptan (chain terminator) | 0.1 |
| Potassium persulfate (catalyst) | 0.06 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 7.28 and contained 21.0% by weight of polymer.

EXAMPLE 21

| | Parts by weight |
|---|---|
| Butadiene | 20 |
| Acrylonitrile | 20 |
| Water | 200 |
| "Lux"[1] (emulsifier) | 2.0 |
| Dodecyl mercaptan (chain terminator) | 0.2 |
| Potassium persulfate (catalyst) | 0.12 |

[1] Sodium stearate.

The above ingredients were placed in a glass reaction vessel and the mixture was agitated at 50° C. for 2 hours. At the end of this time, the vessel was cooled to room temperature (20° C.–25° C.) and unreacted material was vented.

EXAMPLE 22

| | Parts by weight |
|---|---|
| Butadiene | 40 |
| Methacrylonitrile | 40 |
| Water | 144 |
| "Lux"[1] (emulsifier) | 4.0 |
| Dodecyl mercaptan (chain terminator) | 0.4 |
| Potassium persulfate (catalyst) | 0.24 |

[1] Sodium stearate.

The above ingredients were placed in a glass reaction vessel and the mixture was agitated at 50° C. for 3 hours. At the end of this time, the vessel was cooled to room temperature (20° C.–25° C.) and unreacted material was vented. The latex produced had a pH of 7.99 and contained 41.3% by weight of polymer.

EXAMPLE 23

| | Parts by weight |
|---|---|
| Butadiene | 26.7 |
| Vinyl chloride | 6.6 |
| Water | 60 |
| "Lux"[1] (emulsifier) | 1.7 |
| Dodecyl mercaptan (chain terminator) | 0.033 |
| Potassium persulfate (catalyst) | 0.066 |

[1] Sodium stearate.

The above ingredients were placed in a glass reaction vessel and the mixture was agitated at 50° C. for 22 hours. At the end of this time, the vessel was cooled to room temperature (20° C.–25° C.) and unreacted material was vented. The latex produced had a pH of 9.42 and contained 8.9% by weight of polymer.

EXAMPLE 24

| | Parts by weight |
|---|---|
| Butadiene | 30 |
| Methallyl alcohol | 7.5 |
| Water | 75 |
| "Lux"[1] (emulsifier) | 1.9 |
| Ferrous sulfate ($7H_2O$) (chain terminator) | 0.19 |
| Sodium pyrophosphate ($Na_4P_2O_7 \cdot H_2O$) (chain terminator) | 1.13 |
| Benzoyl peroxide (catalyst) | 0.1 |

[1] Sodium stearate.

The above ingredients were placed in a glass reaction vessel and the mixture was agitated at 50° C. for 22 hours. At the end of this time, the vessel was cooled to room temperature (20° C.–25° C.) and unreacted material was vented. The latex produced had a pH of 8.68 and contained 13.9% by weight of polymer.

EXAMPLE 25

| | Parts by weight |
|---|---|
| Chloroprene | 7 |
| Vinyl chloride | 3 |
| Water | 18 |
| "Lux"[1] (emulsifier) | 0.5 |
| Dodecyl mercaptaan (chain terminator) | 0.01 |
| Potassium persulfate (catalyst) | 0.03 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 6.35 and contained 13.7% by weight of polymer.

EXAMPLE 26

| | Parts by weight |
|---|---|
| Butadiene | 56.2 |
| Acrylonitrile | 12 |
| Vinyl acetate | 6.75 |
| Water | 150 |
| "Lux"[1] (emulsifier) | 3.75 |
| Ferrous sulfate ($7H_2O$) (chain terminator) | 0.38 |
| Sodium pyrophosphate ($Na_4P_2O_7 \cdot H_2O$) (chain terminator) | 2.25 |
| Benzoyl peroxide (catalyst) | 0.19 |

[1] Sodium stearate.

The above ingredients were placed in a glass reaction vessel and the mixture was agitated at 50° C. for 3 hours. At the end of this time, the vessel was cooled to room temperature (20° C.–25° C.) and unreacted material was vented.

EXAMPLE 27

| | Parts by weight |
|---|---|
| 2-ethylhexyl acrylate | 33.3 |
| Water | 60 |
| "Lux"[1] (emulsifier) | 1.7 |
| Dodecyl mercaptan (chain terminator) | 0.033 |
| Potassium persulfate (catalyst) | 0.066 |

[1] Sodium stearate.

The above ingredients were placed in a glass reaction vessel and the mixture was agitated at 50° C. for 18 hours. At the end of this time, the vessel was cooled to room temperature (20° C.–25° C.) and unreacted material was vented. The latex produced had a pH of 8.8 and contained 33.1% by weight of polymer.

EXAMPLE 28

| | Parts by weight |
|---|---|
| 2-ethylhexyl acrylate | 35 |
| Vinyl chloride | 65 |
| Water | 200 |
| "Nacconol NRSF"[1] (emulsifier) | 3.0 |
| Potassium persulfate (catalyst) | 0.1 |

[1] Kerylbenzene sulfonic acid (sodium salt).

The above ingredients were placed in a glass reaction vessel and the mixture was agitated at 50° C. for 22 hours. At the end of this time, the mixture was cooled to room temperature (20° C.–25° C.) and unreacted material was vented. The latex produced had a pH of 10.05 and contained 33.4% by weight of polymer.

EXAMPLE 29

This soil conditioner was a natural rubber latex (American Anode) having a pH of 10.2 and containing 62.8% by weight of polymer.

*Results of soil conditioning tests on Whippany loam*

| Latex of Example No. | Polymer Used | Rating | Concentration of Polymer Applied to Soil in weight percent |
|---|---|---|---|
| 1 | Butadiene (sodium stearate)[1] | 123 | 0.005 |
| 2 | Butadiene (dodecylamine hydrochloride)[1] | 91 | 0.02 |
| 3 | Butadiene (sodium nonyl sulfate)[1] | 91 | 0.005 |
| 4 | Butadiene ("Igepon T")[1] | 136 | 0.005 |
| 5 | Butadiene ("Nacconol NRSF")[1] | 96 | 0.005 |
| 6 | Butadiene ("Duponol ME")[1] | 151 | 0.005 |
| 7 | Butadiene ("Aerosol MA")[1] | 113 | 0.005 |
| 8 | Butadiene ("Aerosol OT")[1] | 219 | 0.005 |
| 9 | Butadiene (decylbenzyl sodium sulfate)[1] | 181 | 0.005 |
| 10 | Dimethylbutadiene | 151 | 0.1 |
| 11 | Isoprene | [2]182 | 0.1 |
| 12 | Chloroprene | 177 | 0.1 |
| 13 | Butadiene-isoprene | 205 | 0.1 |
| 14 | Butadiene-isopropenylacetylene | 141 | 0.1 |
| 15 | Butadiene-chloroprene | 177 | 0.1 |
| 16 | Butadiene-methyl acrylate | [2]471 | 0.25 |
| 17 | Butadiene-methyl methacrylate | [2]287 | 0.2 |
| 18 | Chloroprene-methyl acrylate | 177 | 0.1 |
| 19 | Butadiene-styrene | [2]147 | 0.2 |
| 20 | Chloroprene-styrene | 177 | 0.1 |
| 21 | Butadiene-acrylonitrile | [2]452 | 0.2 |
| 22 | Butadiene-methacrylonitrile | [2]470 | 0.2 |
| 23 | Butadiene-vinyl chloride | 284 | 0.1 |
| 24 | Butadiene-methallyl alcohol | 294 | 0.1 |
| 25 | Chloroprene-vinyl chloride | 177 | 0.1 |
| 26 | Butadiene-acrylonitrilevinylacetate | [2]54 | 3.0 |
| 27 | 2-ethylhexyl acrylate | [2]140 | 0.1 |
| 28 | 2-ethylhexyl acrylatevinylchloride | 176 | 0.1 |
| 29 | Natural rubber latex (American Anode) | 469 | 0.1 |

[1] Material indicated in parenthesis is emulsifier.
[2] These ratings indicate material retained on 20-mesh in comparison to that retained on 20-mesh for standard conditioner. Other ratings are based on 60-mesh retention.

As a typical illustration of a method of applying these soil conditioners to the soil, a mixture of 20 parts by weight of the latex produced e. g. according to the directions in Example 6 supra., 54 parts by weight of water, and 10 parts by weight of ammonium hydroxide was applied to approximately three inch depth in heavy clay soil by spraying and also by multiple stream equipment attached ahead of a disking machine, before the ground was planted with soy-beans.

As another typical illustration of a method of applying these soil conditioners, a mixture of 20 parts by weight of a latex such as that formed according to Example 6, supra., 57 parts by weight of water, and 7 parts by weight of "N. F. 2A" (a liquid mixture containing 65% by weight of ammonium nitrate, 21.7% by weight of ammonia, and 13.3% by weight of water), was applied to approximately three inch depth in heavy clay soil by spraying and also by multiple stream equipment attached ahead of a disking machine, before the ground was planted with soy-beans.

According to still another typical illustration, a mixture of 2 parts by weight of latex, as for example that produced according to directions in Example 6, supra., 420 parts by weight of water, and 1 part by weight of ammonium hydroxide, was applied in a single stream for surface application over rows seeded for sugar beets in heavy clay soil.

According to still another typical illustration, a mixture of 25 parts by weight of active polymer in latex form, as for example that formed in accordance with Example 6, supra., 267 parts by weight of water, and 12.5 parts by weight of ammonium hydroxide, was applied by multiple sprayer for surface application on heavy crusty soil containing rows seeded for corn.

According to still another typical illustration, a mixture of 25 parts by weight of active polymer in latex form, as for example that formed in accordance with Example 1, supra., 267 parts by weight of water, and 12.5 parts by weight of ammonium hydroxide, was applied by multiple sprayer for surface application on heavy crusty soil containing rows seeded for corn.

It is apparent from the foregoing that the latices used in practice of the invention possess not only marked soil conditioning value, but that their soil conditioning effect is in many instances remarkable as compared with a soil conditioner used as a standard which is among those presently considered to be of substantial merit. The ready availability and cheapness of monomers useful in producing soil conditioners used in practice of the invention as well as the small quantities of the polymeric elastomer formers necessary to produce soil conditioning effects, indicate clearly the economies realizable in practice of the invention.

It will be equally evident to persons skilled in the art that butalastic and other elastomer-forming polymers other than those of the specific example and otherwise specifically disclosed herein, will be suitable for practice of the invention. The invention is, therefore, not to be considered as limited to the use of such specifically disclosed substances but to include as well elastomer-forming substances which are within the scope of the appended claims.

I claim:

1. The method of improving the porosity of soils having low porosity which comprises impregnating the soil with a coagulable material consisting essentially of a latex of a water-insoluble, nonelectrolyte, elastomeric polymer produced by polymerization of a conjugated diene compound containing from 4 to 6 carbon atoms per molecule, the quantity of the polymer deposited being 12 to 100 pounds per acre of soil per inch of depth of penetration of the soil, thereby leaving the soil porous, loose and crumbly.

2. The method of improving the porosity of soils having low porosity which comprises impregnating the soil with a coagulable material consisting essentially of a latex of a water-insoluble, nonelectrolyte, elastomeric polymer produced by copolymerization of a conjugated diene compound containing from 4 to 6 carbon atoms per molecule with at least one olefinically unsaturated compound, the quantity of the polymer deposited being 12 to 100 pounds per acre of soil per inch of depth of penetration of the soil, thereby leaving the soil porous, loose and crumbly.

3. The method of improving the porosity of soils having low porosity which comprises impregnating the soil with a coagulable material consisting essentially of a latex of a water-insoluble, nonelectrolyte, elastomeric polymer produced by homopolymerization of a compound selected from the group consisting of butadiene, chloro-substituted butadiene and methyl-substituted butadiene, the quantity of the polymer deposited being 12 to 100 pounds per acre of soil per inch of depth of penetration of the soil, thereby leaving the soil porous, loose and crumbly.

4. The method of improving the porosity of soils having low porosity which comprises impregnating the soil with a coagulable material consisting essentially of a latex of a water-insoluble, nonelectrolyte, elastomeric polymer produced by copolymerization of a compound selected from the group consisting of butadiene, chloro-substituted butadiene and methyl substituted butadiene with at least one olefinically unsaturated compound, the quantity of the polymer deposited being 12 to 100 pounds per acre of soil per inch of depth of penetration of the soil, thereby leaving the soil porous, loose and crumbly.

5. The method of improving the porosity of soils having low porosity which comprises impregnating the soil with a coagulable material consisting essentially of a latex of a water-insoluble, nonelectrolyte, elastomeric polymer formed by emulsion polymerization of butadiene-1,3, the quantity of the polymer deposited being 12 to 100 pounds per acre of soil per inch of depth of penetration of the soil, thereby leaving the soil porous, loose and crumbly.

6. The method of improving the porosity of soils having low porosity which comprises impregnating the soil with a coagulable material consisting essentially of a latex of a water-insoluble, nonelectrolyte, elastomeric polymer formed by emulsion copolymerization of butadiene and isoprene, the quantity of the polymer deposited being 12 to 100 pounds per acre of soil per inch of depth of penetration of the soil, thereby leaving the soil porous, loose and crumbly.

7. The method of improving the porosity of soils having low porosity which comprises impregnating the soil with a coagulable material consisting essentially of a latex of a water-insoluble, nonelectrolyte, elastomeric polymer formed by emulsion copolymerization of butadiene and chloroprene, the quantity of the polymer deposited being 12 to 100 pounds per acre of soil per inch of depth of penetration of the soil, thereby leaving the soil porous, loose and crumbly.

8. The method of improving the porosity of soils having low porosity which comprises impregnating the soil with a coagulable material consisting essentially of a latex of a water-insoluble, nonelectrolyte, elastomeric polymer formed by emulsion polymerization of dimethylbutadiene, the quantity of the polymer deposited being 12 to 100 pounds per acre of soil per inch of depth of penetration of the soil, thereby leaving the soil porous, loose and crumbly.

9. The method of improving the porosity of soils having low porosity which comprises impregnating the soil with a coagulable material consisting essentially of a latex of a water-insoluble, nonelectrolyte, elastomeric polymer formed by emulsion homopolymerization of butadiene-1,3, the quantity of the polymer deposited being 12 to 100 pounds per acre of soil per acre of soil per inch of depth of penetration of the soil, thereby leaving the soil porous, loose and crumbly.

References Cited in the file of this patent

UNITED STATES PATENTS

| | | |
|---|---|---|
| 2,190,003 | Hulst | Feb. 13, 1940 |
| 2,550,371 | Naps et al. | Apr. 24, 1951 |

OTHER REFERENCES

Hackh's Chemical Dictionary (3rd edition), McGraw-Hill Book Co., Inc. (1944), New York, page 295.